US010100456B2

(12) United States Patent
Buso et al.

(10) Patent No.: US 10,100,456 B2
(45) Date of Patent: Oct. 16, 2018

(54) LAUNDRY APPLIANCE

(71) Applicant: Electrolux Appliances Aktiebolag, Stockholm (SE)

(72) Inventors: Danny Buso, San Quirino (IT); Flavio Rigo, Pordenone (IT); Marco Rigo, Pordenone (IT)

(73) Assignee: Electrolux Appliances Aktiebolag (SE)

( * ) Notice: Subject to any disclaimer, the term of this patent is extended or adjusted under 35 U.S.C. 154(b) by 0 days.

(21) Appl. No.: 15/106,940

(22) PCT Filed: Dec. 10, 2014

(86) PCT No.: PCT/EP2014/077228
§ 371 (c)(1),
(2) Date: Jun. 21, 2016

(87) PCT Pub. No.: WO2015/096984
PCT Pub. Date: Jul. 2, 2015

(65) Prior Publication Data
US 2017/0022653 A1    Jan. 26, 2017

(30) Foreign Application Priority Data
Dec. 24, 2013 (EP) .................................... 13199504

(51) Int. Cl.
*D06F 39/12* (2006.01)
*D06F 29/00* (2006.01)
*D06F 58/20* (2006.01)

(52) U.S. Cl.
CPC ............ *D06F 39/12* (2013.01); *D06F 29/005* (2013.01); *D06F 58/20* (2013.01)

(58) Field of Classification Search
CPC ........ D06F 39/12; D06F 29/005; D06F 58/20; D06F 39/125; D06F 39/005
See application file for complete search history.

(56) References Cited

U.S. PATENT DOCUMENTS 6,920,676 B2 *   7/2005   Fitton ..................... D06F 39/12
                                                    29/428
7,275,398 B2 *  10/2007   Kim ....................... D06F 39/12
                                                    312/228
(Continued)

FOREIGN PATENT DOCUMENTS

EP         2594182 A1      5/2013
KR      20060114119 A     11/2006

OTHER PUBLICATIONS

Machine Translation of KR20060114119 (Kim et al.); pp. 4-5, printed from www.espacenet.com.*
(Continued)

*Primary Examiner* — Kimberley S Wright
(74) *Attorney, Agent, or Firm* — RatnerPrestia

(57) ABSTRACT

Laundry appliance (1), for example laundry washing machine, laundry dryer or laundry washer dryer, having a) a cabinet (2) with a housing (10) having at least one front face (112A, 112B) and at least one front panel (12), b) at least one fixing device (38, 22, 131) for fixing said front panel (12) to the housing (10) by applying a fixing force in a fixing direction (FD), and c) at least one pulling device (20, 30, 12A, 12B) for exerting a pulling force (F) in a pulling direction (PD) onto the front panel (12) pulling the front panel (12) against at least one front face (112A, 112B) of the housing (10, 10A, 10B). The fixing direction (FD) of the fixing force is different to the pulling direction (PD) of the pulling force (F), and the fixing device (38A, 131) is coupled to the pulling device (30) in such a way that the fixing force generates the pulling force (F) or is partly transformed into the pulling force (F).

11 Claims, 15 Drawing Sheets

(56) References Cited

U.S. PATENT DOCUMENTS

| | | | | |
|---|---|---|---|---|
| 7,494,197 B2* | 2/2009 | Han | ........................ | D06F 39/12 |
| | | | | 312/228 |
| 7,685,847 B2* | 3/2010 | Lee | ........................ | D06F 39/12 |
| | | | | 312/228 |
| 7,748,243 B2* | 7/2010 | Park | ........................ | D06F 39/12 |
| | | | | 312/228 |
| 8,083,299 B2* | 12/2011 | Funcken | ................. | D06F 39/12 |
| | | | | 312/228 |
| 2011/0221313 A1 | 9/2011 | Stegerwald | | |
| 2015/0184331 A1* | 7/2015 | Lee | ........................ | D06F 39/12 |
| | | | | 312/228 |

OTHER PUBLICATIONS

International Search Report in corresponding International Application No. PCT/EP2014/077228, dated Feb. 16, 2015.

* cited by examiner

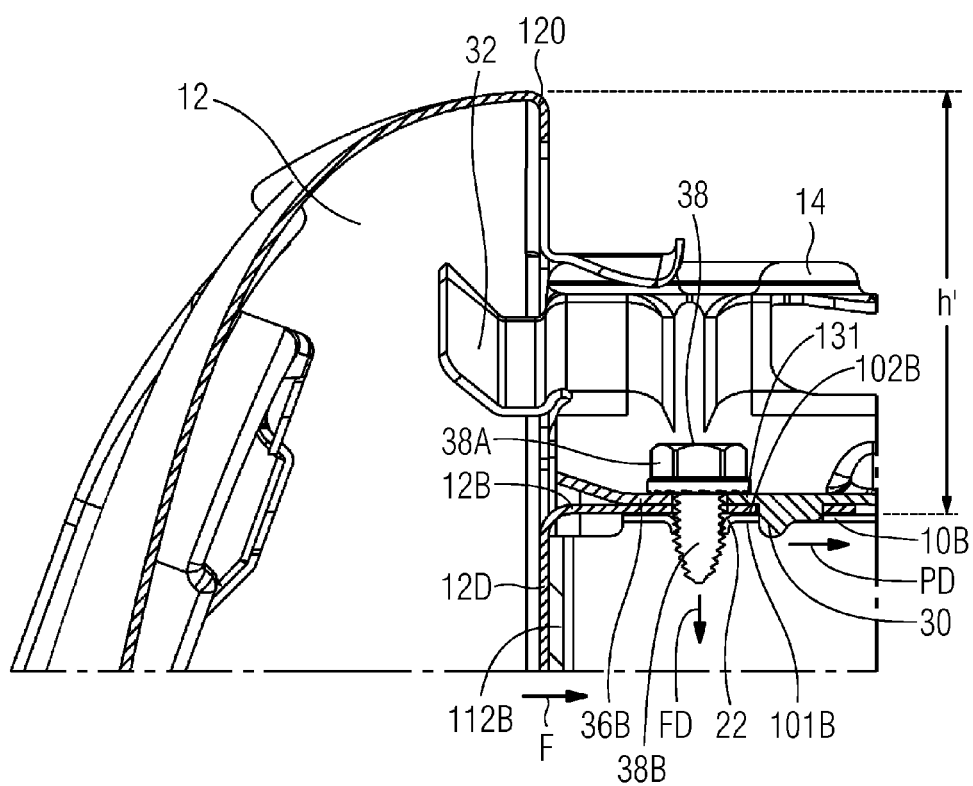

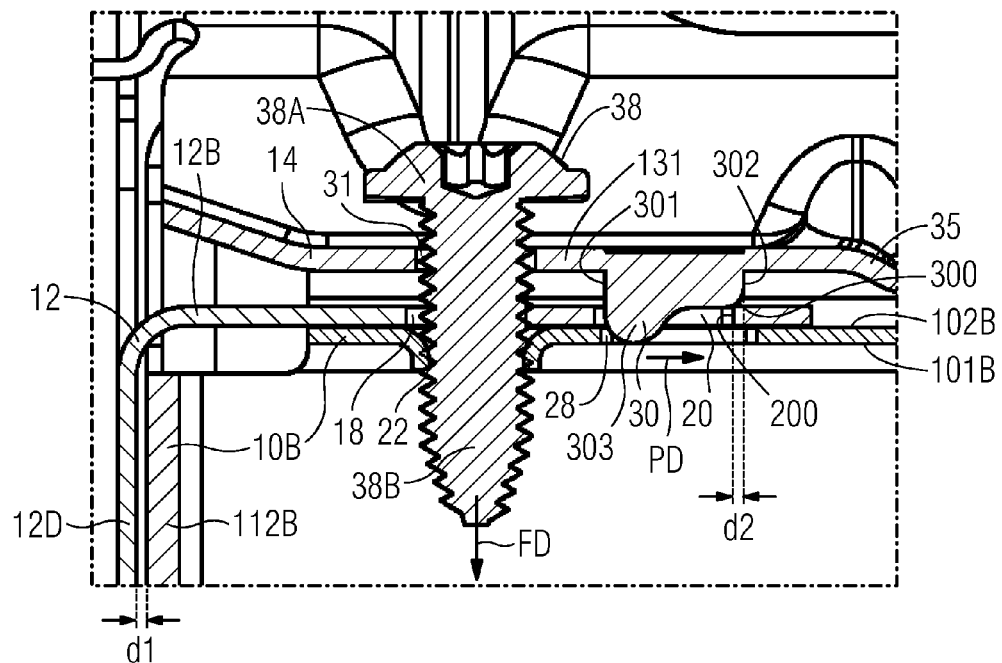
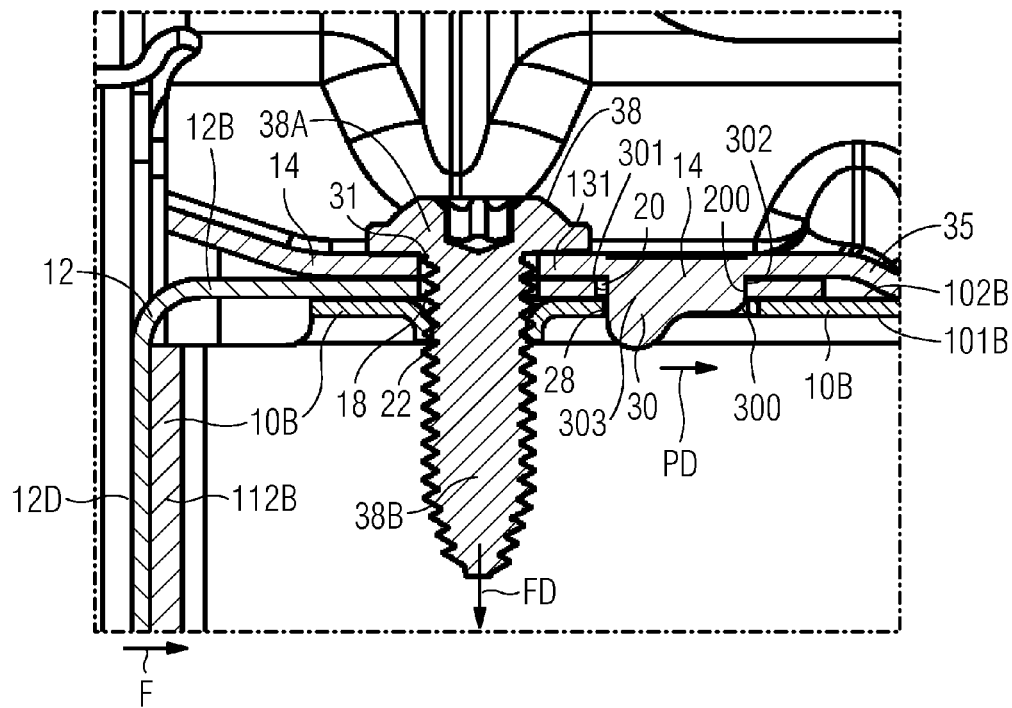

LAUNDRY APPLIANCE

FIELD

The present invention relates to a laundry appliance, for example a laundry washing machine, a laundry dryer or washer dryer.

BACKGROUND

A cabinet for a laundry appliance, for example a laundry washing machine, includes usually a housing with two side walls and a rear wall and a front panel. The front panel is directly fixed to the side walls of the housing at the front side of the cabinet by screws.

In order to avoid rattling noises during operation, for instance during spinning of a washing machine, it is desirable to avoid gaps between the front panel and front faces of the housing and to even press the front panel under a certain pressure against the front faces of the housing so that due to this pre-tension rattling noises are prevented. This is achieved by using screws being screwed in a fixing movement in a fixing direction perpendicular to the front panel towards the front faces and thereby pulling at the same time the front panel towards the front faces by the screws. Thus, in such known solution, the screws are at the same time used as fixing elements and pulling elements with the fixing direction and the pulling direction being identical.

SUMMARY OF SELECTED INVENTIVE ASPECTS

It is an object of the present invention to provide a laundry appliance having a cabinet with a housing and a front panel, which front panel can be easily fixed and pulled against the front face(s) of the housing, preferably to achieve a certain pre-tension to avoid rattling noises.

A laundry appliance, for example laundry washing machine, laundry dryer or laundry washer dryer, according to an embodiment of the invention comprises
- a cabinet with a housing having at least one front face and with at least one front panel,
- at least one fixing device for fixing said front panel to the housing by applying a fixing force in a fixing direction and
- at least one pulling device for exerting a pulling force in a pulling direction onto the front panel pulling the front panel against at least one front face of the housing.

The fixing direction of the fixing force is different to the pulling direction of the pulling force. In other words, the fixing device has a different fixing direction or works in a different direction than the pulling direction of the pulling device which is the direction for pulling the front panel towards the front face(s).

The pulling device is a separate device, separate from the fixing device, and comprises different components and/or is advantageously arranged at a distance from the fixing device.

Furthermore, the fixing device is coupled to the pulling device in such a way that the fixing force generates the pulling force or is partly transformed into the pulling force.

Being "coupled to" means a mechanical coupling whereby forces are conducted or transferred, i.e. a force-conducting connection.

Thus, by this mechanical coupling, the fixing device supplies the separate pulling device with the force necessary to achieve the pulling of the front panel, so that although fixing direction and pulling direction differ, the pulling can be achieved during or by the fixing movement.

In an advantageous embodiment the or each fixing device comprises at least two fixing elements being, at least partly under the influence of or during applying of the fixing force, movable or moved in a fixing movement in a fixing direction relative to or towards or into each other. At least one first fixing element is coupled to or being part of the front panel and at least one second fixing element is coupled to or is a part of the housing.

The fixing elements are preferably a screw and a corresponding screw hole or counter-thread.

In a preferred embodiment the or each pulling device comprises at least two pulling elements, a first pulling element which is or can be coupled to the front panel and a second pulling element which is or can be coupled to the fixing device, wherein the first pulling element is, by the fixing force, displaced relative to the second pulling element by a pulling displacement in a displacement movement in the pulling direction or having at least a component in the pulling direction. Thereby the pulling force onto the front panel is generated or transformed from the fixing force. Usually the pulling force is larger if the pulling displacement is larger.

Preferably one pulling element is a protruding element and the other pulling element is a pulling recess or opening or slot, and the protruding pulling element is forced by the fixing force into the pulling recess sliding with a sliding edge or surface on a surface adjacent or neighboured to the pulling recess until a rear edge or surface of the protruding pulling element bears against an inner rear wall of the pulling recess resulting in the displacement in the pulling direction of the two pulling elements. "Rear" means as seen in the pulling direction.

Advantageously the sliding edge or surface is curved and/or convex. Further advantageously the rear edge or surface and the inner rear wall are orthogonal to the displacement movement and/or to the pulling direction.

Furthermore, the protruding pulling element can be provided with a further protruding positioning aid edge to pre-position the pulling element into the pulling recess.

Also, a recess or slot can be provided in the housing to receive the protruding pulling element after it is engaged within the pulling recess or pulling slot wherein this recess or slot is arranged to overlap with the pulling recess or slot.

In cases where there is no gap between the front panel and the front face(s) from the beginning, the pulling force is completely used for exerting a pressure between the front panel and the front face(s) it bears against.

However, in the majority of cases, there is initially (i.e. before fixing the front panel to the housing by the at least one fixing device) a gap between the front panel and the at least one front face. In this case and the pulling device by the pulling force first closes, in a pulling movement (generated by fixing the front panel to the housing by the at least one fixing device), the gap and then exerts a residual pulling force as a pressure between the front panel and the at least one front face. Preferably, to support this, the pulling displacement of the two pulling elements is larger than the gap. The residual pulling force is preferably maintained by elastic restoring forces.

In a preferred embodiment the pulling direction is substantially orthogonal or perpendicular to the fixing direction. Furthermore, typically, the pulling direction is substantially horizontal. Preferably the fixing direction is substantially vertical and/or downwards or in the direction of gravity, so that the fixing takes place from above.

The fixing movement of the fixing elements and/or the displacement movement of the two pulling elements is preferably a linear or straight movement.

In a further advantageous embodiment, the housing has two side walls and at least one front face is provided at the front of each of the two side walls. Preferably each front face is provided with a corresponding fixing device and a corresponding pulling device.

In an advantageous embodiment, the cabinet further comprises a bracket element (or: bridge element, transversal element), which substantially extends in between the two side walls and has two end portions. Each end portion of the bracket element and an upper or uppermost region of a corresponding side wall and a corresponding upper or uppermost region of the front panel are connected with each other, preferably by means of the same fixing device.

Preferably the bracket element comprises one of the pulling elements of the pulling device.

In a preferred embodiment each end portion of said bracket element rests at least partially on and/or is mounted from above onto a corresponding resting surface of a corresponding side wall which resting surface faces upwardly.

Each resting surface is for example an upper surface of a connection bar. The resting surface or connection bar is preferably formed at the inner side of the corresponding side wall at a depth downwards from the upper edge of the side wall and/or comprises at least one fixing element of the fixing device.

In a further embodiment each end portion of said bracket element is displaced downwardly with respect to a middle part of the bracket element.

In an advantageous embodiment an upper edge of the front panel is arranged vertically higher than the upper edges of the side walls and higher than the bracket element and/or hides front faces of the side walls as well as the bracket element from sight from the front in horizontal direction. Preferably the bracket element extends parallel to an upper edge of said front panel. Thus, the front panel is more rigid at its upper edge and a more precise fixation of the front panel is possible in this region.

The front panel can be a substantially flat or slightly concave or convex sheet part.

In a preferred embodiment said bracket element is formed integrally with said front panel. A bracket element integrally formed with the front panel provides additional rigidity for such a front panel. An integrally formed bracket element shall be understood in that the front panel and the bracket element are made from one part. No connection means between front panel and bracket element are necessary. In a further advantageous embodiment said front panel and said bracket element are made of the same material, for example made of sheet metal such as steel. Front panel and bracket element can be provided as a part of one single piece of the same material. Made of sheet metal, front panel and bracket element can be produced by a bending and/or deep-drawing process. The sheet material may have a thickness between 0.5 mm to 1.6 mm, preferably 0.7 mm In an alternative also advantageous embodiment said bracket element is formed as a separate part from said front panel.

Preferably a corresponding connecting part, for example connecting flap, extending from the rear side of the front panel is jointly fixed with a corresponding end portion of said bracket element to a corresponding side wall, for example resting surface, preferably by means of the same fixing element, for example fixing screw, wherein preferably the connecting part, for example connecting flap, has a fixing hole, for example screw hole, which is arranged to overlap one of, for example a front fixing hole, for example screw hole, of the resting surface and at least one of, for example a front fixing hole, for example screw hole of the end portion of the bracket element.

It is advantageous to arrange the corresponding connecting part, for example connecting flap, in between a front portion of the end portion of said bracket element and the resting surface of the side wall, while preferably to arrange a further backward portion of the end portion of said bracket element directly on the resting surface of the side wall, wherein preferably a step is provided between the front portion and the further backward portion of the end portion to compensate for the difference in height or thickness.

In a special embodiment a hook is provided at or near each end portion of the bracket element to be arranged in a receiving section of the front panel to pre-position and/or hold the bracket element in relation to the front panel.

Furthermore, for a more stable construction a supporting surface is provided at the middle part of the bracket element supporting a, preferably horizontal, connecting flange of the front panel, wherein preferably overlapping screw holes are provided in the supporting surface and the connecting flange to fix the same to each other by means of inserted screws.

In a preferred embodiment at least a part of and preferably all of said fixing elements or screws are fixed from above in a vertical fixing direction.

Usually the front panel comprises at least one, preferably two, accommodation recesses for accommodation of a detergent drawer and/or a user interface or operating panel. Preferably said bracket element is arranged in a region above said accommodation recess(es) and/or comprises fixing components for fixing at least one detergent drawer and/or a user interface in a region below said bracket element. Thus, an easy fixation is enabled for the detergent drawer and/or the user interface. Positioning of the detergent drawer and/or user interface is facilitated.

The bracket element can also form a support for a worktop or top plate and comprises fixing components for fixing said worktop to said bracket element.

BRIEF DESCRIPTION OF THE DRAWINGS

The present invention will be described further with reference to the accompanied drawings, in which FIG. 8 depicts, in the view of FIGS. 6 and 7, the front top portion of the cabinet in a yet further mounting stage after fixing with a fixing screw, FIG. 9 illustrates a sectional longitudinal enlarged view of a part of the front top portion of the cabinet for the laundry appliance before the pulling in a further embodiment, FIG. 10 depicts, in the view of FIG. 9, the part of the front top portion of the cabinet for the laundry appliance after pulling and fixing.

DETAILED DESCRIPTION OF EXAMPLE EMBODIMENTS

The cabinet 2 as illustrated is provided for a laundry appliance, in this example a laundry washing machine, and comprises a housing 10, a front panel (or front wall) 12 and a bracket element (or: bridging element, transversal element or bar) 14.

The housing 10 includes two vertical side walls 10A, 10B, a vertical rear wall 10C and a bottom part 10D. For example, the side walls 10A and 10B, the rear wall 10C and the bottom part 10D of the housing 10 are connected to each other by screws or other fastening elements.

The bracket element 14 connects both side walls 10A and 10B in an upper front region in a transversal horizontal direction thereby providing for and increasing the stiffness of the cabinet 2 in the front.

Figure 11:
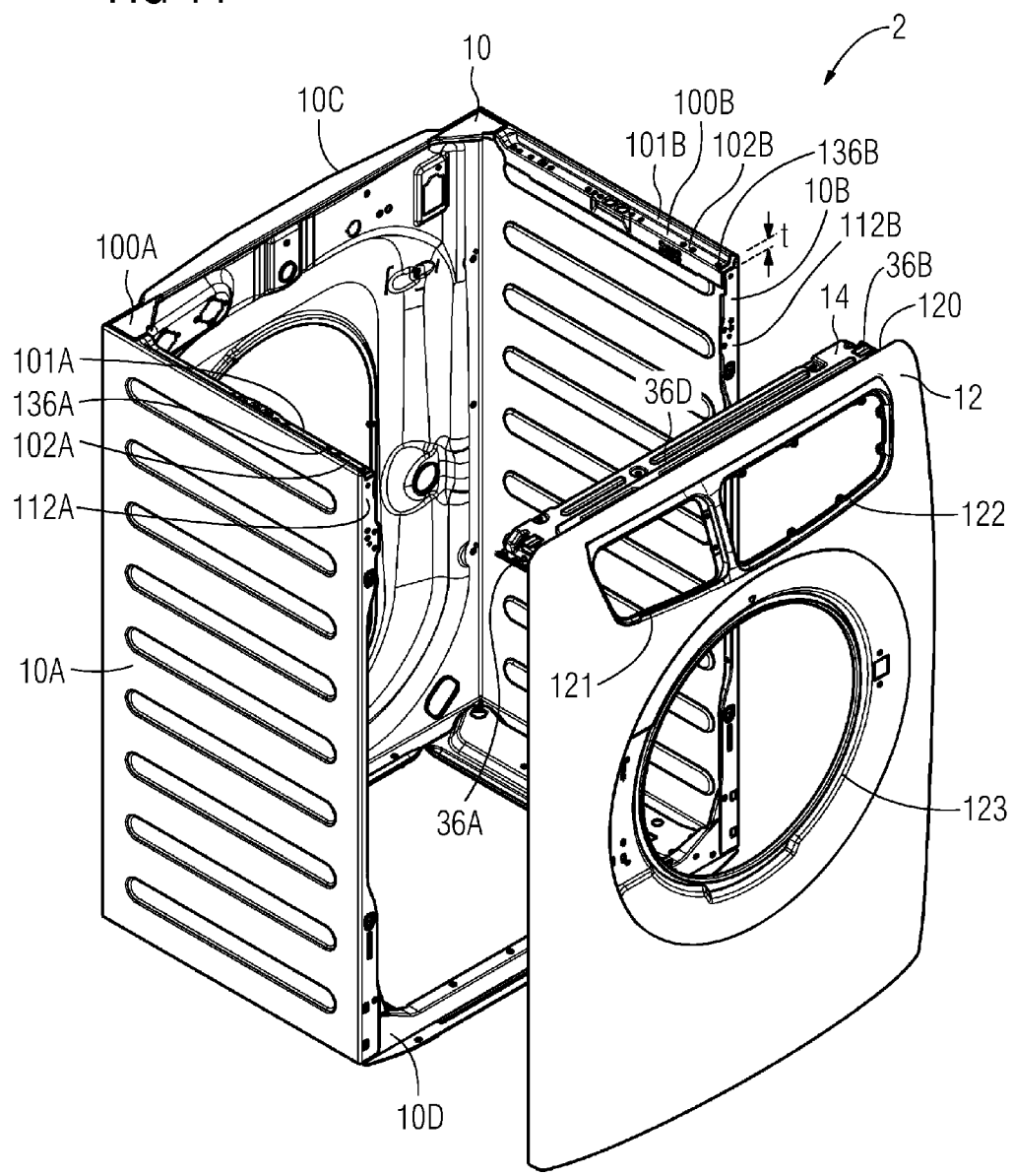
FIG. 11 illustrates an exploded perspective view of a cabinet for a laundry appliance according to another embodiment of the present invention with an integrated bracket element.
Figure 12:
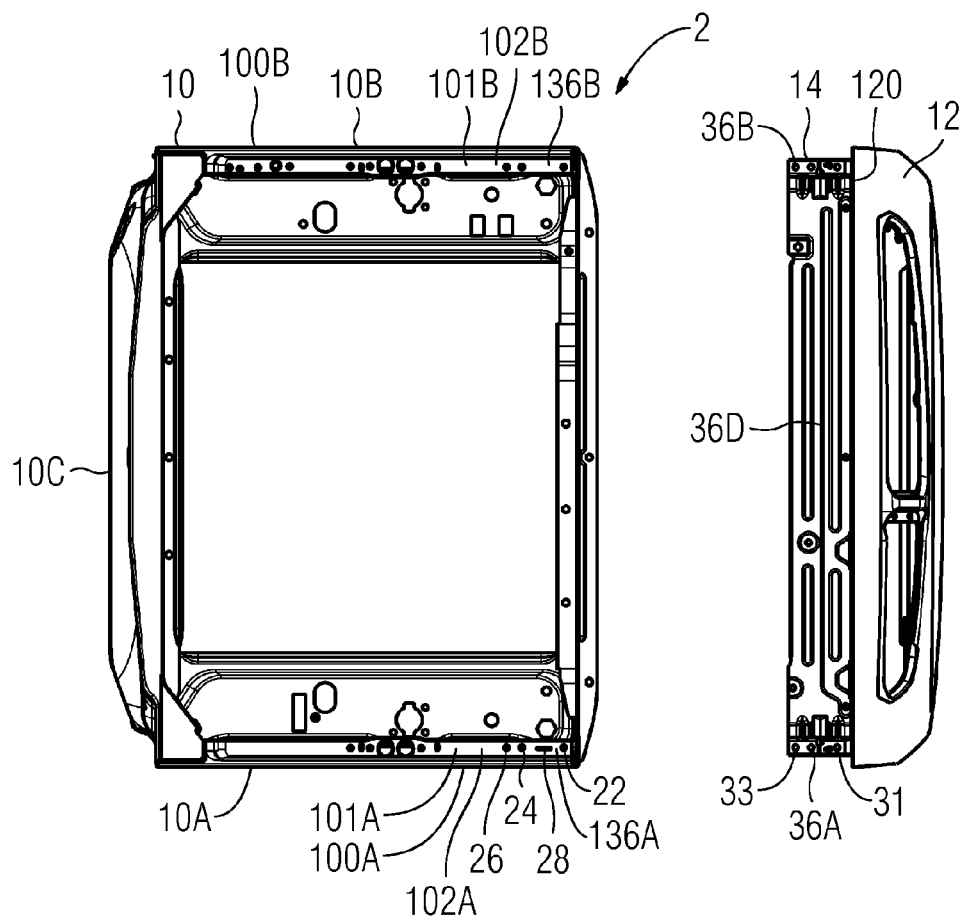
FIG. 12 is a view from above onto the cabinet of FIG. 11.
Figure 13:
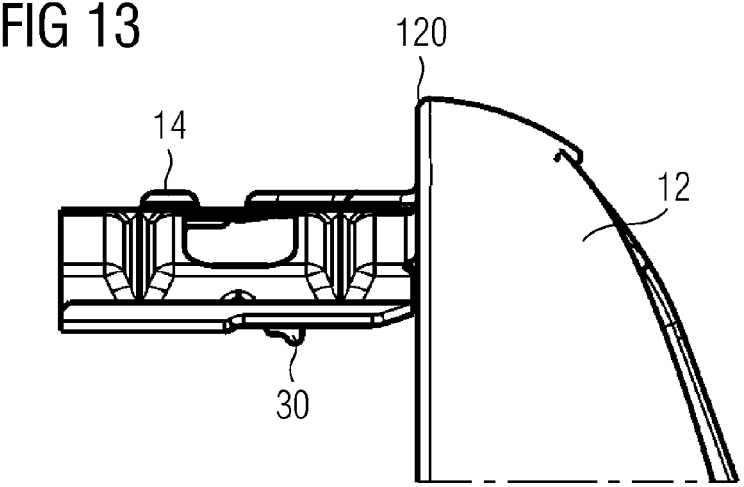
FIG. 13 shows a side view of a top portion of the front panel with integrated bracket element.
Figure 14:
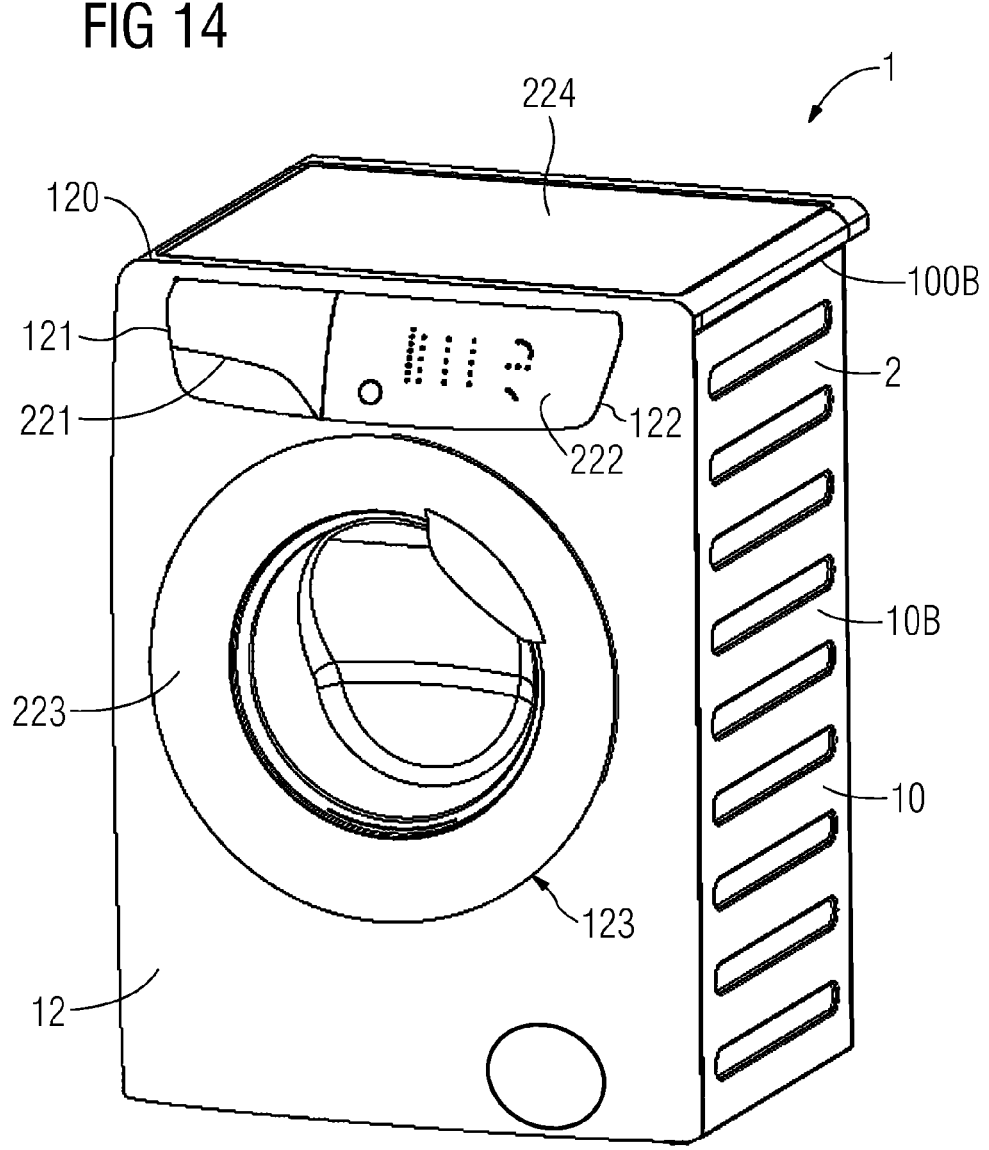
FIG. 14 shows an example of a finally mounted laundry appliance.

In the embodiments of FIGS. 1 to 10 the bracket element 14 is provided as a separate part from the front panel 12, whereas in the embodiments of FIGS. 11 to 13 the bracket element 14 is integral with the front panel 12, for example formed as a single piece part. FIG. 14 shows an example of a finally assembled appliance for all embodiments.

For example, the bracket element 14 has an elongated, preferably substantially flat, form of a bracket or a bar or sheet or the like with two relatively short end portions 36A and 36B which are connected with the relative long horizontal middle part (or: central portion) 36D through a relatively short step-like or bent or S-shaped intermediate or transition portion and are basically parallel to the middle part 36D and, in the mounted state, displaced downwards with respect to the middle part 36D.

Preferably, the bracket element 14 is made of a metal sheet, for example with extruding portions produced by stamping, punching and/or bending. In this example, said metal sheet has a thickness of about 0.6 to 1.5 mm, for example 1.2 mm in case of a separate bracket element 14 and 0.7 mm in case of an integral bracket element 14. Also the side walls 10A and 10B and/or the front panel 12 are preferably made of metal sheet, but can also be made of a plastics material.

The end portion 36A of the bracket element 14 is connected from above to a corresponding connecting portion 136A positioned on a connection bar (or: connection flange, connection bend) 101A at the inner side of the side wall 10A, i.e. the side facing the other side wall 10B, whereas the other end portion 36A of the bracket element 14 is connected from above to a corresponding connecting portion 136B positioned on a connection bar 101B at the inner side of the side wall 10B, i.e. the side facing the other side wall 10A.

Each connection bar 101A and 101B at each side wall 10A and 10B has an upper substantially flat and horizontal surface as a resting (or: bearing) surface for at least a part of the corresponding end portion 36A or 36B of the bracket element 14 and at least two screw holes 22 and 26, matching in the mounted state with a respective screw hole 31 and 33 in the end portion 36A or 36B of the bracket element 14 to insert and rotate a fixing screw 38 from above vertically in each pair of overlapping or matching screw holes 22 and 31 and 26 and 33 as parts of the connecting portion 136A or 136B. Preferably also a third screw hole 24 and/or a slot 28 (to be explained later) are provided in each connecting portion 136A or 136B (see FIGS. 2 and 4).

Figure 1:
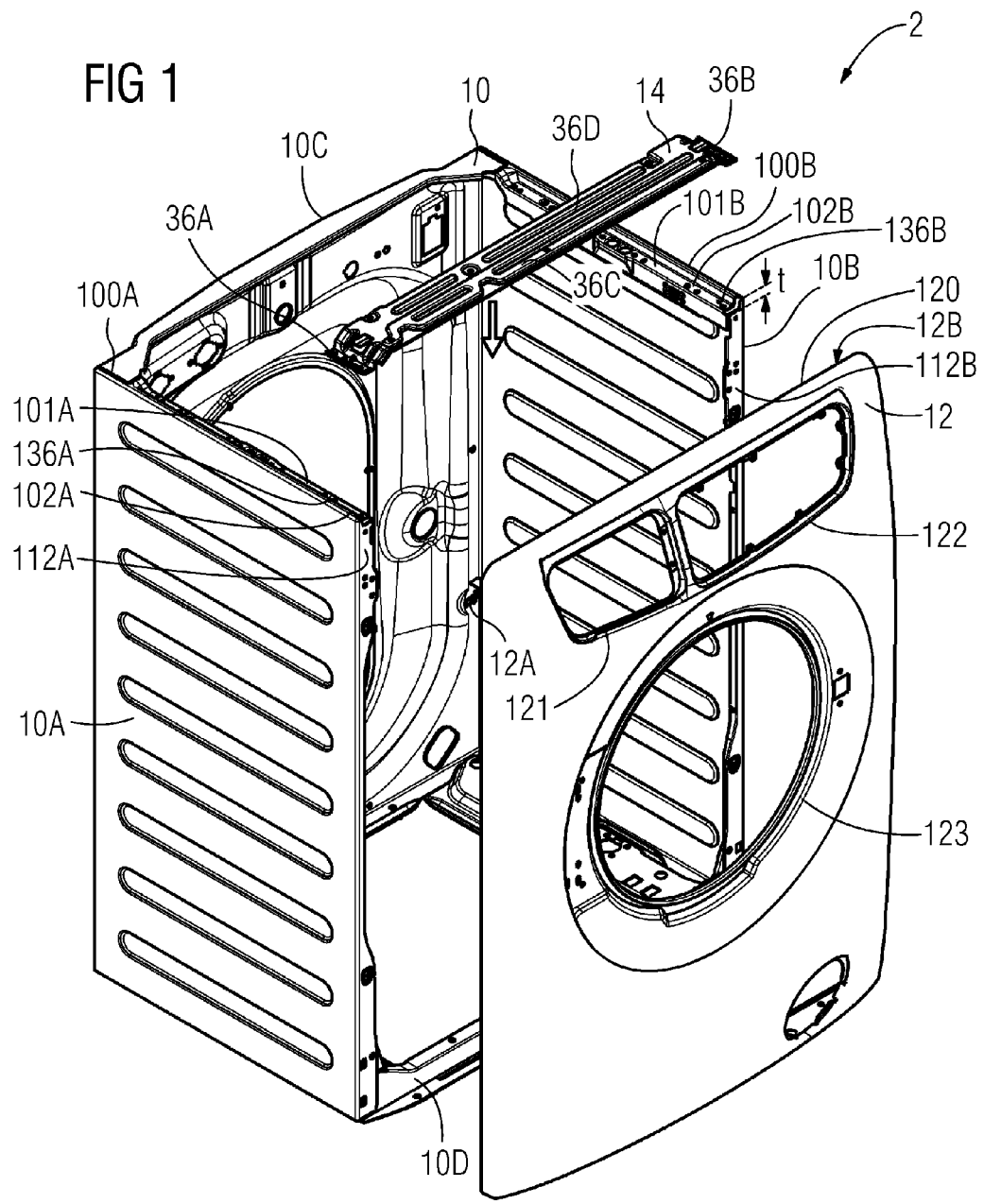
FIG. 1 illustrates an exploded perspective view of a cabinet for a laundry appliance according to an embodiment of the present invention with a separate bracket element.

Each connection bar 101A and 101B or its resting surface 102A and 102B is displaced downward or placed deeper than the upper edge 100A and 100B of the side wall 10A and 10B by a vertical distance or depth t (see FIG. 1). By this measure it is possible to counter-sink or hide the fixing screws 38 also from the side by the upper part of the side wall 10A or 10B just below the upper edge 100A or 100B and to avoid scratching of the outer side wall surface during assembly.

The front panel (or: front wall) 12 covers, for example as seen from the front in a horizontal projection, completely the front side of the housing 10 and for example the front faces (or: front sides) 112A and 112B of the two side walls 10A and 10B. The front panel 12 for example at least abuts with or extends further outwardly than the housing 10 or the side walls 10A and 10B in lateral and vertical directions.

Figure 2:
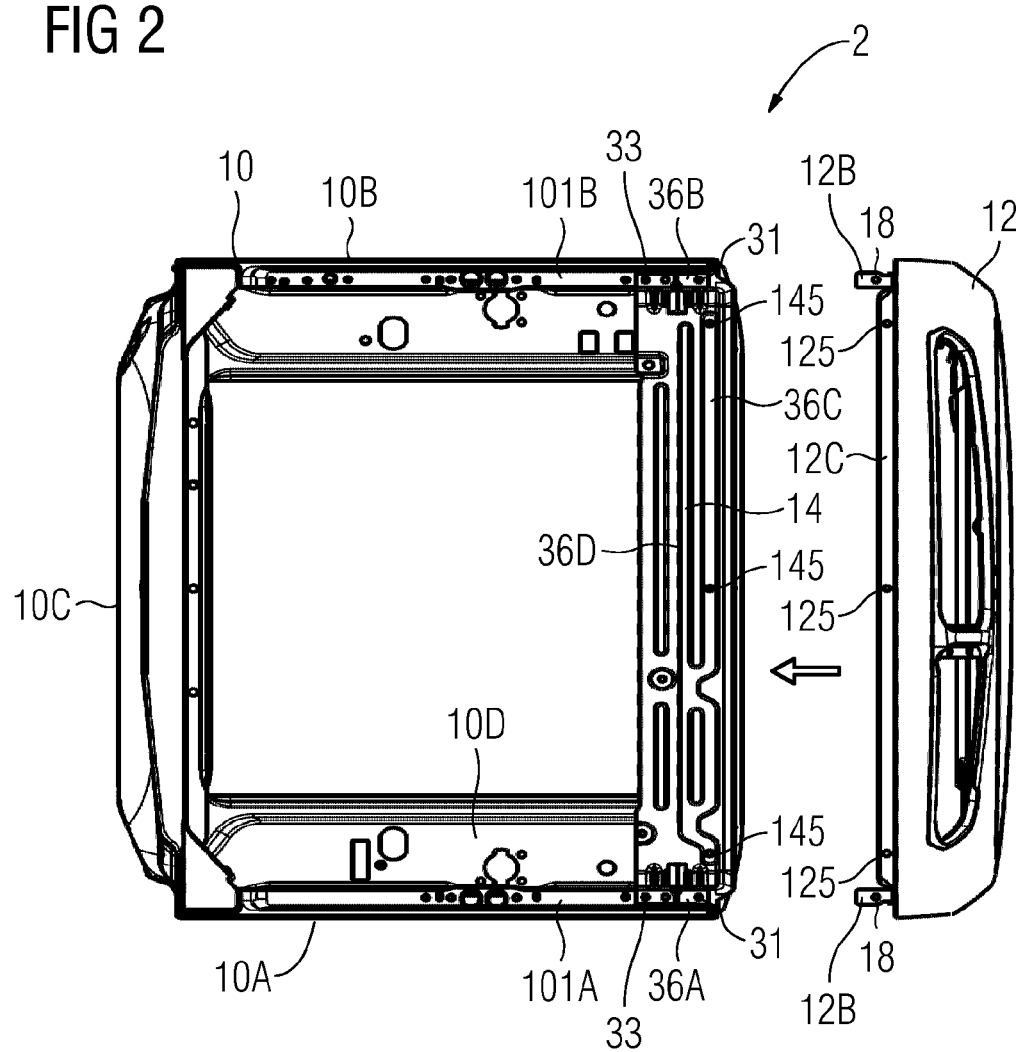
FIG. 2 is a view from above onto the cabinet of FIG. 1.
Figure 3:
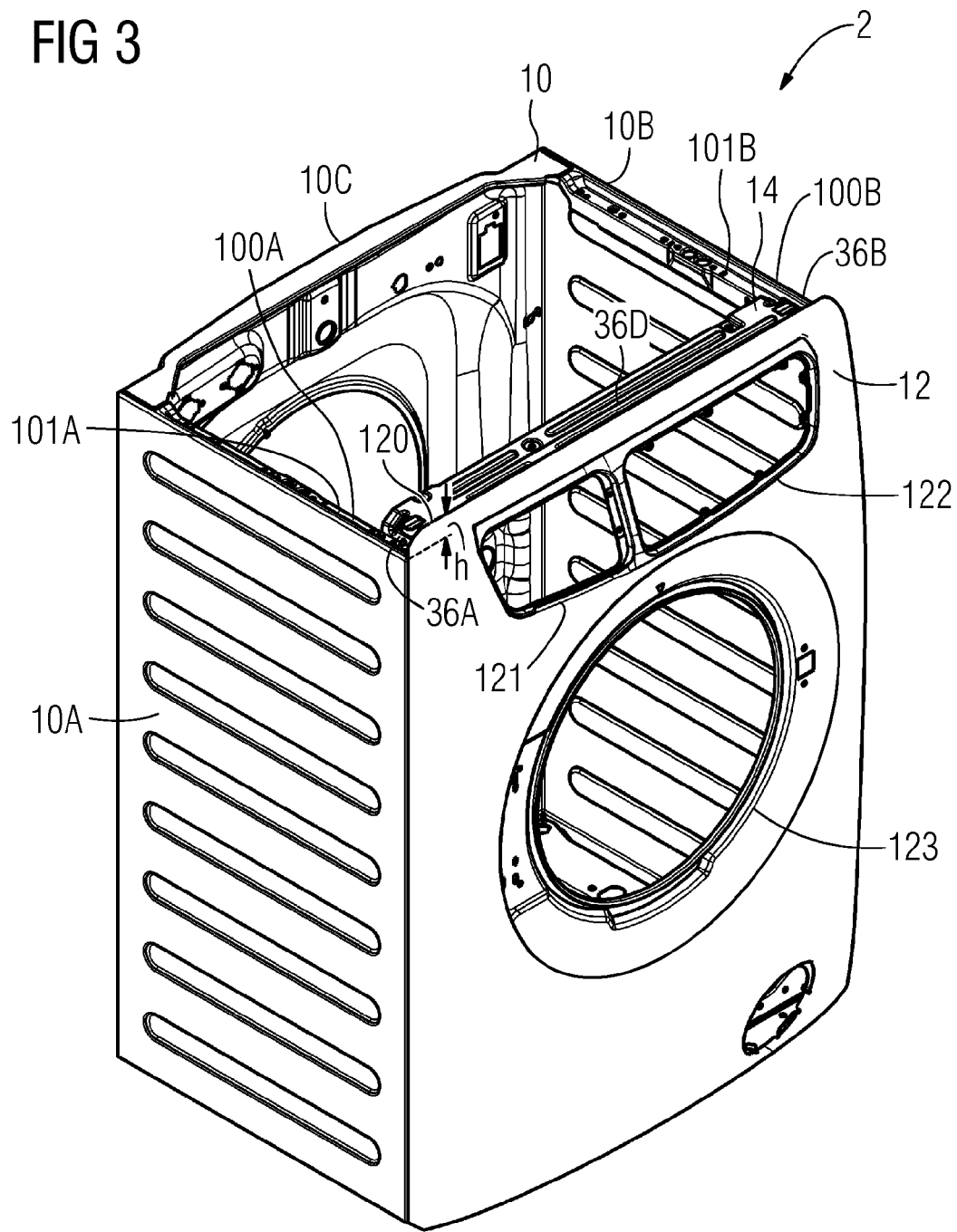
FIG. 3 illustrates a perspective view of the cabinet for the laundry appliance of FIGS. 1 and 2 after the bracket and the front panel are both mounted.

Preferably the front panel 12, in the mounted state as shown in FIG. 2, at its upper edge 120 has a greater height than the side walls 10A and 10B or their respective upper edges 100A and 100B. The resulting difference in height h between the upper edge 120 of the front panel 12 and the upper edge 100A of the side wall 10A is shown in FIG. 2 and is normally the same also between the upper edge 120 of the front panel 12 and the upper edge 100B of the side wall 10B. This height difference h is preferably chosen large enough so that the front face 112A and 112B and the upper edges 100A and 100B of the side walls 10A and 10B are hidden or covered as seen from the front, by the front panel 12 and preferably also that the upper edge 120 of the front panel 12 is arranged above the bracket 14 when mounted so that also the bracket 14 will be hidden or covered behind the front panel 12 when looking from the front. In an embodiment with a top plate, like the top plate 224 shown in FIG. 14, also the thickness of the top plate should be accounted for so that the height difference h is sufficient to also cover the front of the top plate. Typically the values of the difference in height h will range in between a few, e.g. 5, millimetres and some, e.g. up to 10, centimetres.

In the front panel 12 a drawer opening 121 for arranging a drawer 221 for detergents etc. (FIG. 14) and an operating panel opening 122 for arranging an operating panel 222 (FIG. 14) are provided, for instance next to each other, and, e.g. below, a door opening 123 for arranging a door 223 for loading and unloading the laundry.

In the embodiments shown in FIGS. 1 to 10 the front panel 12 is a part separate from the bracket element 14 and thus needs to be fixed separately to the housing 10, but preferably together with the bracket element 14 in one process step.

In FIGS. 11 to 13, the bracket element 14 is fixed to the housing 10 and thus also fixes, automatically or at the same time or in the same process step, the front panel 12 being integral with it.

In the embodiments of FIGS. 1 to 10, for connecting the front panel 12 to the side walls 10A and 10B and with the bracket element 14, the front panel 12 includes, in each of the two upper corners, a horizontal connecting flap 12A and 12B, which is for example made by cutting and bending from the sheet metal of the front panel 12. The connecting flaps 12A and 12B extend rearwards and horizontally from the rear side or inner wall 12D of the front panel 12 and are substantially flat extending in a horizontal plane.

Figure 4:
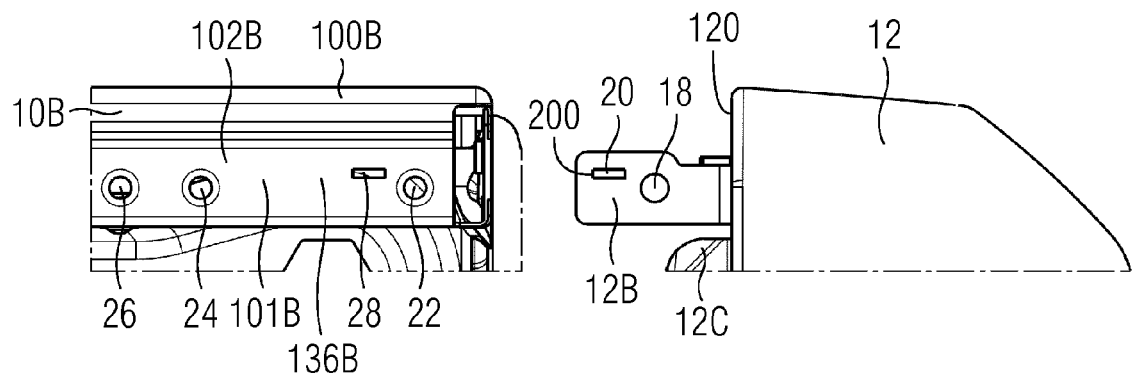
FIG. 4 is a partial top view of a side of a front panel and a side wall of the cabinet according to the embodiment of FIGS. 1 to 3.
Figure 5:
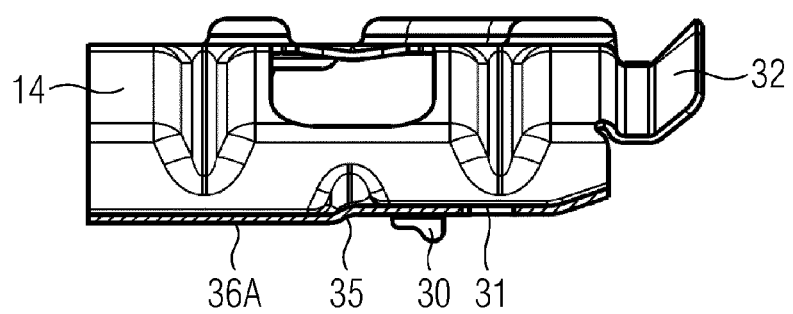
FIG. 5 illustrates a side view of a bracket end portion of the cabinet according to the embodiment of FIGS. 1 to 4.

As can be seen best in FIG. 4, each connecting flap 12A and 12B includes at least one screw hole 18 and a pulling slot 20. When mounting the front panel 12 the connecting flap 12B (or 12A) is placed with its flat lower surface onto the front portion of the horizontal resting surface 102B (or 102A) of the horizontal bar 101B (or 101A) of the side wall 10B (or 10A) in the connecting portion 136B (or 136A) until or so that the screw hole 18 of the connecting flap 12B (or: 12A) overlaps with the screw hole 22 of the connecting portion 136B (or 136A) below and the pulling slot 20 of the connecting flap 12B (or: 12A) overlaps with the slot 28 of the connecting portion 136B (or 136A).

The bracket element 14 is placed, with its respective end portions 36A and 36B on top of the connecting flaps 12A and 12B in its front portion and directly onto the resting surface 102A and 102B in a subsequent further backward portion in such a way or until the screw hole 31 of the bracket element 14 overlaps with the screw hole 18 of the connecting flap 12B (or: 12A) underneath and with the screw hole 22 of the connecting portion 136B (or 136A) yet further underneath and the screw hole 33 of the bracket element 14 overlaps with the screw hole 26 of the connecting portion 136B (or 136A) underneath. In this way there is, as can be seen best in FIGS. 6 to 10, a sandwich structure of the three elements 101A or 101B and 12A or 12B and 36A and 36B, stacked one above the other, in the front region towards the front panel 12 and a sandwich structure of only two elements 101A or 101B and 36A and 36B further away from the very front.

In order to provide for intermediate space for the connecting flap 12A or 12B in between the end portion 36A or 36B of the bracket element 14 and the connection bar 101A or 101B of the side wall 10A or 10B and, at the same time, to allow for direct contact behind the connecting flap 12A or 12B there is a transition or step 35 in the lower surface of the end portion 36A or 36B compensating for the different heights required.

Further, the bracket element 14 includes a protruding hook 32 at each front portion, for example in the end portions 36A or 36B or intermediate portions towards the middle part 36C, for prepositioning the bracket element 14 and the front panel 12 with each other by hooking the hooks 32 into corresponding receiving sections, for example flanges or openings, at the rear side or inner wall of the front panel 12.

Also the front panel 12, at its inner wall 12D and between the connecting flaps 12A and 12B is provided with a horizontal connecting flange 12C which is supported by a supporting surface 36C of the middle part 36D of the bracket element 14. Preferably, the flange 12C has several e.g. three, screw holes 125 matching with screw holes 145 in the supporting surface 36C for additional fixing by screws (not shown).

In the embodiments according to FIGS. 11 to 13, where the bracket element 14 is integral with the front panel 12 and there is therefore no need for the connecting flaps 12A and 12B and consequently those are not provided, the step 35 is also not provided and the end portion 36A or 36B of the bracket element 14 rests on the resting surface 102A or 102B of the connection bar 101A or 101B also in the front, preferably over the whole length in longitudinal direction (not shown).

As illustrated in FIGS. 6 to 10, a first fixing screw 38 is now screwed or inserted and rotated through the three overlapping screw holes 31, 18 and 22 in the front in each case, preferably in a vertical fixing direction FD pointing downward or from above as indicated by the arrows in FIGS. 7 to 10. The screw head 38A bears from above against an at least in this region flat bottom wall 131 of the bracket 14 in the corresponding end portion 36A or 36B and the thread portion 38B of the screw 38 is screwed or turned into a counter-thread in the screw hole 22 in the connection bar 101A or 101B of the side wall 10A or 10B (FIGS. 8 and 10). The bottom wall 131 of the bracket 14 bears from above on the connecting flap 12A or 12B of the front panel 12 and the connecting flap 12A or 12B bears from above on the resting surface 102A or 102B of the side wall 10A or 10B. By these first fixing screws 38 the front panel 12 and the bracket element 14 are jointly fixed to the side walls 12A and 12B.

A second fixing screw (not shown) can be screwed or inserted and rotated through the two overlapping screw holes 33 and 26 to directly fix the bracket element 14 to the side walls 12A and 12B to provide for a four point connection with higher rigidity.

The screws, for example screws 38, can be self-cutting, i.e. their thread portions 38B cut their own counter-threads into a collar provided around the screw hole 22.

Instead of screws other fastening elements can be provided, which for example provide for a fixing movement in the vertical fixing direction FD, for instance rivets or snapping elements, as long as they provide for a sufficient fixing force.

As the fixing direction FD is vertical and from above, for example along the direction of gravity, against a horizontal counter or resting surface, the connection is very stable at the fixing points and easy to assemble, as the weight of the front panel 12 is carried and as enough space during the assembly is provided for the fixing operation even in this case of a high front panel 12 jutting out at the top. Furthermore the screws or other fastening elements can be elegantly hidden from sight.

However, due to the vertical fixing direction FD the fixing movement itself cannot provide for a horizontal pulling force for pulling the front panel 12 towards the housing 10, for example against the front faces 112A and 112B, in order to avoid gaps due to tolerances and disturbing rattling noises as a result of that.

Therefore, in addition, a pulling or positioning device is provided for exerting a pulling force F pulling the front panel 12 towards the housing 10, for example towards or against the front faces 112A and 112B of the side walls 10A and 10B.

Figure 6:
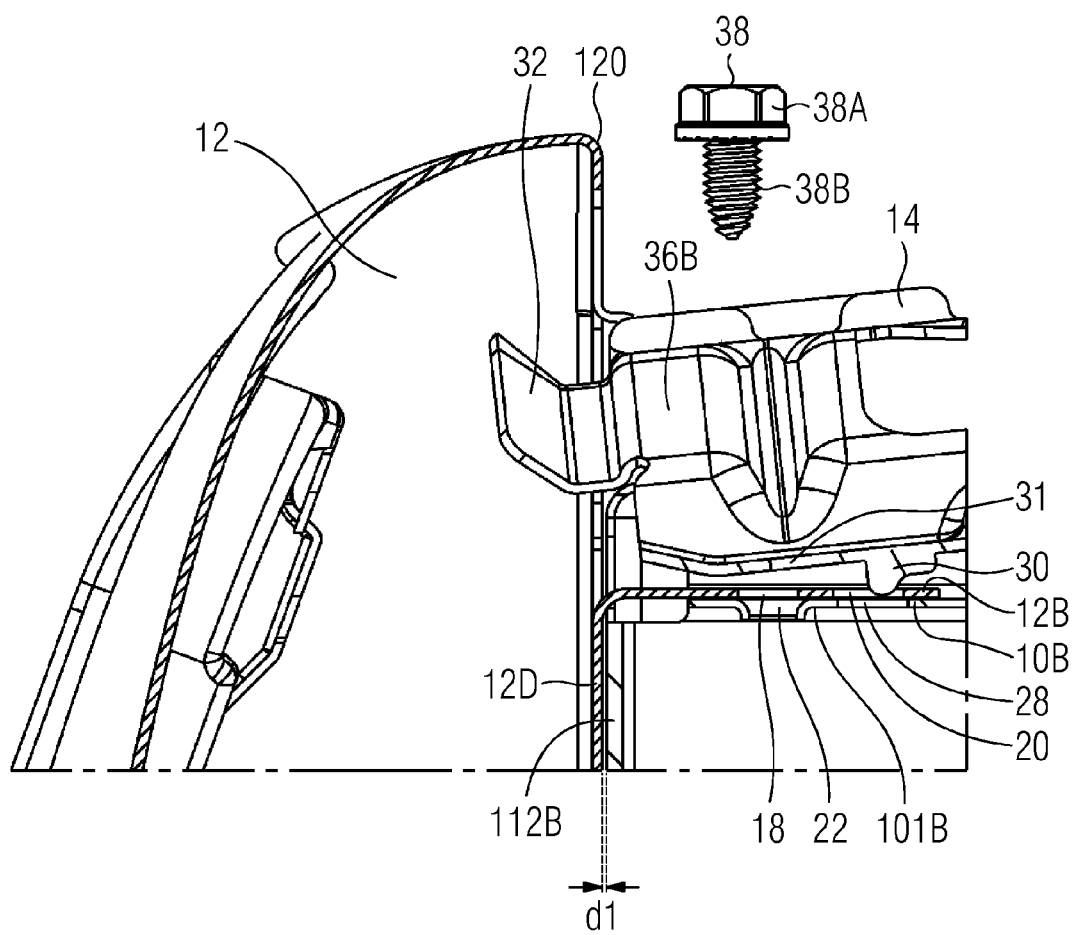
FIG. 6 illustrates a sectional longitudinal view of a front top portion of the cabinet for the laundry appliance during mounting of the bracket and the front panel at the side wall(s)
Figure 7:
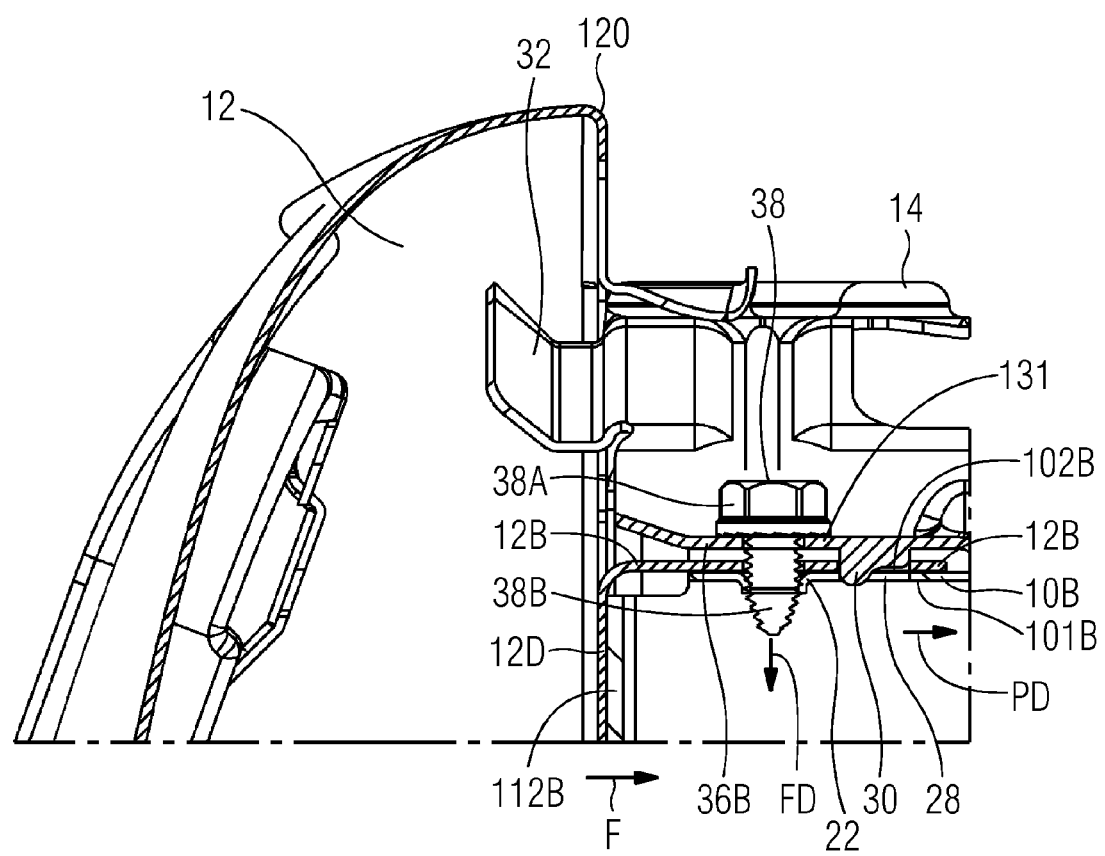
FIG. 7 shows, in the view of FIG. 6, the front top portion of the cabinet in a further mounting stage after pulling with a pulling flap.

If there is, as shown e.g. in FIG. 6 and FIG. 9, initially a gap or a distance d1 between the front panel 12, for example its inner wall 12D, and the housing 10, for example the front faces 112A and 112B, the pulling force F will lead to a pulling movement or displacement in a pulling or positioning direction PD until the gap is closed, i.e. d1=0, and preferably result in a residual pulling pressure, by which the front panel 12, for example its inner wall 12D, is pressed against the housing 10, for example the front faces 112A and 112B, as shown in FIGS. 7 and 8 and 10 for instance.

A preferred embodiment of such pulling or positioning device is illustrated in FIGS. 6 to 8 and another in FIGS. 9 and 10. The pulling or positioning device transforms the fixing force in the fixing movement in the vertical fixing direction FD of the screw 38 into a pulling force F in the horizontal pulling direction PD and preferably comprises pulling flaps 30 at the underside of the bottom wall 131 in the end portions 36A and 36B of the bracket element 14 which pulling flaps 30 interact with the pulling slots 20 of the connecting flap 12A or 12B of the front panel 12 and the positioning slots 28 of the connection bar 101A or 101B when they are in an approximately overlapping position.

The longitudinal axes of the pulling slots 20 and 28 and the pulling flaps 30 each extend, preferably in all embodiments, horizontally and perpendicular to a front plane of the front panel 12 and/or parallel to the side walls 10A and 10B and their upper edges 100A and 100B or wall planes and/or along the longitudinal directions of the horizontal bars 101A and 101B in order to allow for a pulling action in that direction, which corresponds to the pulling direction PD. A rear inner wall of each slot 20 in the inward direction or pulling direction PD is designated by 200.

Now each pulling flap 30 protruding downwards from each horizontal end portion 36 of the bracket element 14 is flat and slightly thinner than the slots 20 and 28 so that it can be inserted into the slots 20 and 28. Furthermore, each pulling flap 30 has a vertical front edge 301 and a vertical rear edge 302 which is shorter than the front edge 301 and ends in a convexly curved guiding or sliding edge 300, e.g. a rounded corner. The front edge 301 preferably ends in a rounded positioning aid edge 303 being the furthest downward part of the flap 30. The guiding or sliding edge 300 preferably is connected with the positioning aid edge 303 by a straight horizontal edge.

During assembly the pulling flap 30 enters first with its positioning aid edge 303 the two slots 28 and 20 and then the sliding edge 300 comes into contact with the upper surface of the connecting flap 12B next to the rear inner wall 200 of the slot 20. The distance between the rear edge 302 of the flap 30 and the rear inner wall 200 of the slot 20 is designated by d2 and is preferably greater than the distance d1, i.e. d2>d1 (FIG. 9).

The screw 38 being screwed in the fixing direction FD exerts a vertical fixing force downward in the fixing direction FD onto the end portion 36A or 36B of the bracket element 14 which, conducted or transferred through the bottom wall 131, presses or forces the pulling flap 30 further into the pulling slot 20 wherein the curved guiding or sliding edge 300 rolls or slides over the upper edge of the rear inner wall 200 and the flap 30 glides or slides or moves into the slot 20 so that the rear edge 302 of the flap 30 eventually rests against the rear inner wall 200 at the inside of the slot 20 (FIG. 7 and FIG. 10).

This results in a pulling movement in the pulling direction PD of the connecting flap 12A or 12B with respect to the pulling flap 30 and thus the connecting flap 12A or 12B exerts a pulling force F onto the front panel 12 which first closes the gap of the distance d1 to the side wall 10A or 10B or its front face 112A or 112B and then results in a residual pulling force F which is a result of elastic deformation within the connecting flap 12A or 12B and the front panel 12 by the distance d2−d1. The residual or remaining pulling force F or pressure of the front panel 12 against the housing 10, e.g. the front faces 112A and 112B, reduces the problem of rattling significantly. The screw hole 18 in the connecting flap 12A or 12B is big enough to allow the latter to be moved relative to the screw 38 by the distance d2 in the pulling direction PD.

The screw 38 is then screwed or turned further into the screw hole 22 to finish its fixing movement in the fixing direction FD until, in a final fixing position of the screw 38, the end portion 36A or 36B is in contact and pressed onto the connecting flap 12A or 12B and the connecting flap 12A or 12B onto the resting surface 102A or 102 (FIG. 8 and FIG. 10). The vertical length of the rear edge 302 of the pulling flap 30 is chosen big enough to allow for this final fixing movement, for example at least as big as the thickness of the connecting flap 12A or 12B. The final height h'=h+t of the upper edge 120 of the front panel 12 over the resting surface 101A or 101B is shown in FIG. 8.

The flap 30 and the slot 20 constitute examples for pulling elements of the pulling device. In an embodiment not shown, the flap 30 and slots 20 and 28 can also be arranged in reverse order or exchanged at the parts. Also pulling elements with bigger and/or more complex sliding and resting surfaces than just edges 300 and 302 etc. can be provided. Other pulling elements for transforming the vertical fixing movement into a horizontal pulling force or also movement are possible, such as a gear, for example toothed gear.

In FIG. 14 the laundry appliance is shown after final assembly. It can be seen that neither fastening elements for fixing the front panel 12 to the housing 10 nor the bracket element 14 are visible from the outer side.

Figure 15:
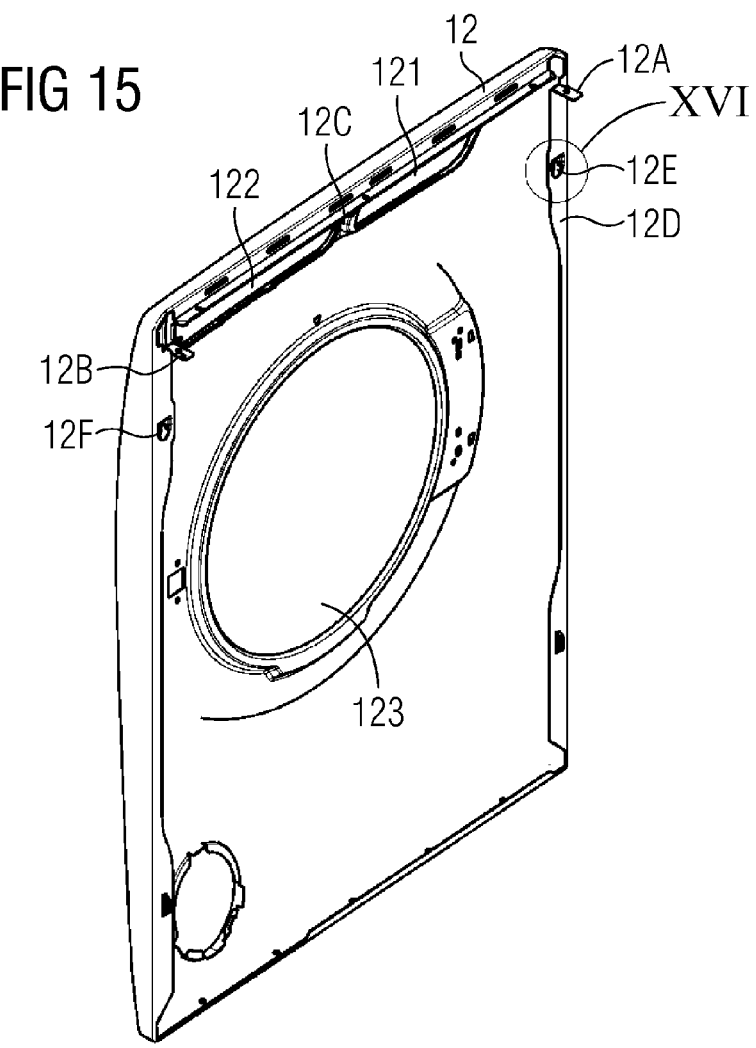
FIG. 15 illustrates a further embodiment of a front panel, FIG. 16 a holding section of the front panel in an enlarged partial view of FIG. 15 marked by XVI in FIG. 15, FIG. 17 a housing for receiving a front panel of FIGS. 15 and 16, FIG. 18 a holding section of the housing in an enlarged partial view of FIG. 17 marked by XVIII in FIG. 17, FIG. 19 a holding element to be used in the holding section of the housing of FIGS. 17 and 18, FIG. 20 a first mounting stage of the two holding sections of FIGS. 15 to 18 in a view from the front, FIG. 21 a final mounting stage of the two holding sections of FIGS. 15 to 18 and 20 in a view from the front and FIG. 22 the final mounting stage of the two holding sections of FIG. 21 in a vertical section.
Figure 16:
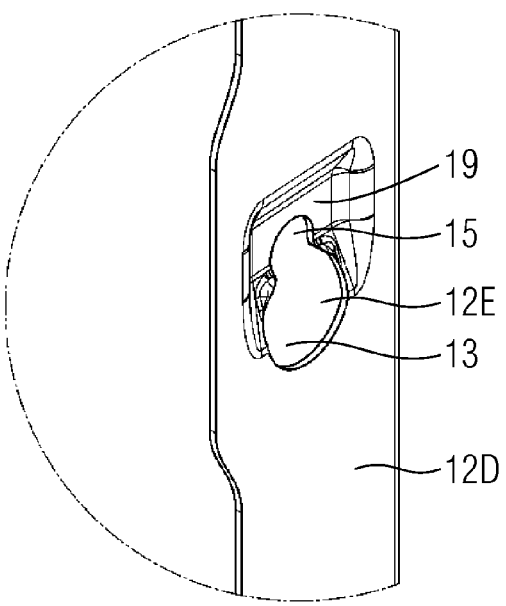

In FIG. 15 an alternative embodiment of a front panel 12 is shown which is similar to the front panel 12 shown in FIG. 1, but has in addition at the inner walls 12D, formed by inwardly bent flanges of the front panel 12, at each side a corresponding holding section comprising a key hole 12E and 12F. Each key hole 12E and 12F comprises a larger hole section 15 having a bigger inner diameter and a smaller hole section 15 with a smaller dinner diameter which are preferably formed in a pocket 19 extending towards the outside of the front panel 12, which can be seen in FIG. 16. The two hole sections 13 and 15 have at their sides facing away from each other a semicircular shape.

Figure 17:
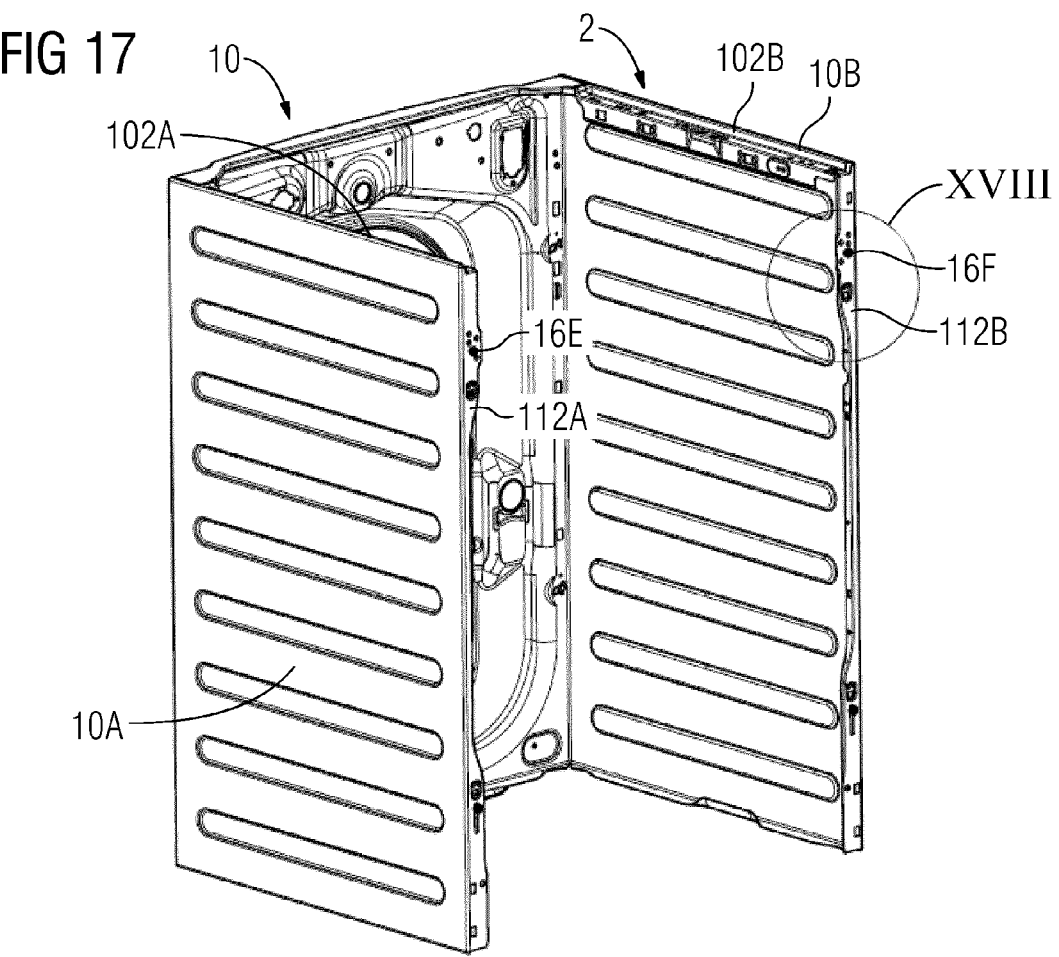
Figure 18:
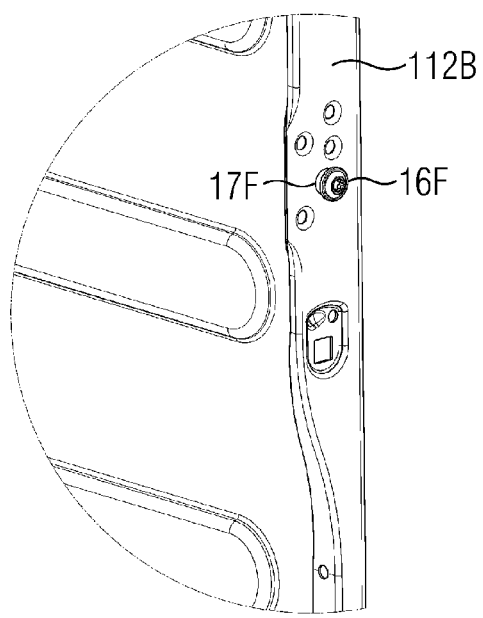
Figure 19:
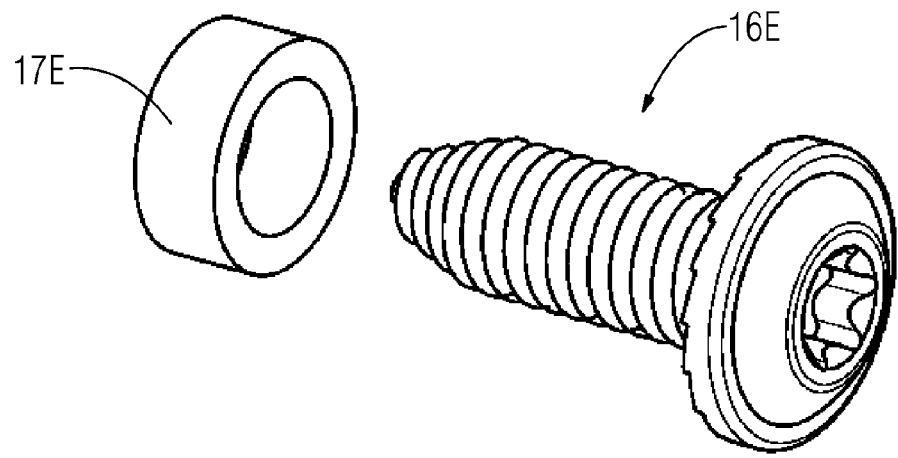

As can be seen in FIGS. 17 and 18 the housing 10 has at the front faces 112A and 112B of the side walls 10A and 10B corresponding holding sections which comprise a holding pin composed of a holding screw 16E and 16F and, as is shown in detail in FIG. 19, also a bushing 17E which is placed upon the thread portion of the holding screw 16E and has a smooth cylindrical outside surface.

Figure 20:
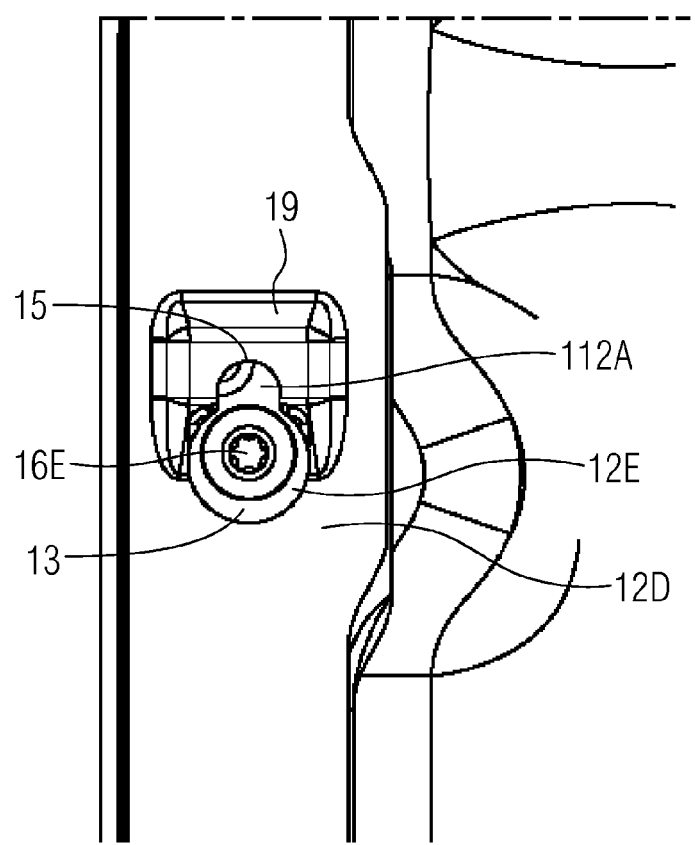
Figure 21:
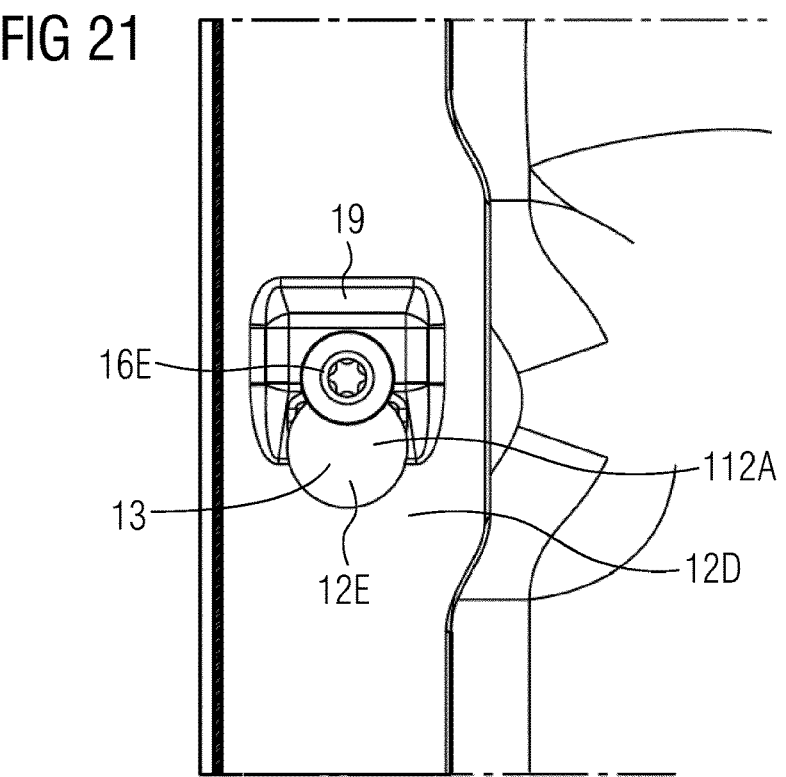
Figure 22:
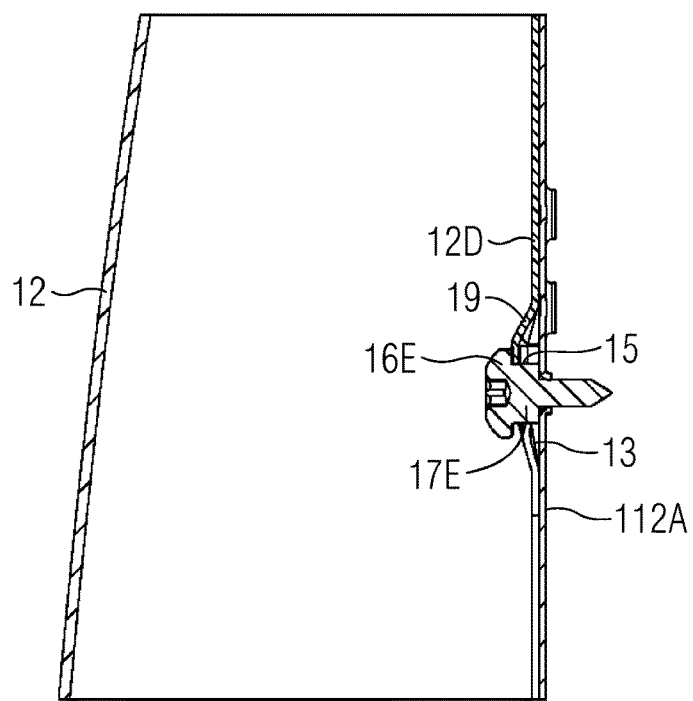

As can be seen in FIGS. 20 to 22 the key hole 12E is placed with its larger section 13 which is larger in its inner diameter than the outer diameter of the screw head of the holding screw 16E through or onto the holding screw 16E. Then the holding screw 16E with the bushing 17E is moved into the smaller hole section 15 until the bushing 17E hits the upper semi-circular edge of the smaller hole section 15 and is firmly held within this smaller hole section 15. The radius of the semi-circular edge corresponds approximately to the radius of the bushing 17. This type of key-hole or bayonet connection provides for a mounting process which is like a hooking process from above and allows for sufficient tolerance during the mounting process in the upper corners described above, for instance at and with the connecting flanges 12A and 12B. Instead of separate parts 16E and 17E also a single piece screw can be provided having a collar instead of the bushing 17E.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

The invention claimed is:

1. Laundry appliance, for example laundry washing machine, laundry dryer or laundry washer dryer, comprising
a) a cabinet with a housing having at least one front face and at least one front panel,
b) at least one fixing device for fixing said front panel to the housing by applying a fixing force in a fixing direction, and
c) at least one pulling device for exerting a pulling force in a pulling direction onto the front panel pulling the front panel against at least one front face of the housing,
d) wherein the fixing direction of the fixing force is different than the pulling direction of the pulling force, and
e) wherein the at least one fixing device comprises a fixing element which is advanceable to increase said fixing force and coupled to a pulling element of the at least one pulling device in such a way that the fixing force generates the pulling force or is partly transformed into the pulling force,
wherein the or each pulling device comprises at least two pulling elements, a first pulling element being coupled to the front panel and a second pulling element being coupled to the fixing device, wherein the first pulling element is, by the fixing force, displaced relative to the second pulling element by a pulling displacement in a displacement movement in the pulling direction or having at least a component in the pulling direction, whereby the pulling force onto the front panel is generated or transformed from the fixing force,
wherein one pulling element is a protruding element and the other pulling element is a pulling recess, and the protruding pulling element is forced by the fixing force into the pulling recess sliding with a sliding edge or surface on a surface adjacent the pulling recess until a rear edge or surface of the protruding pulling element bears against an inner rear wall of the pulling recess resulting in the displacement in the pulling direction of the two pulling elements, and
wherein the sliding edge or surface is curved and/or convex and/or wherein the rear edge or surface and the inner rear wall are orthogonal to the displacement movement and/or pulling direction.

2. A laundry appliance according to claim 1, wherein the or each fixing device comprises said fixing element and an additional fixing element, these two fixing elements being, at least partly under the influence of or during applying of the fixing force, movable or moved in a fixing movement in a fixing direction relative to or towards or into each other, at least one of the two fixing elements being coupled to or being part of the front panel and the other of the two fixing elements being coupled to or being part of the housing.

3. A laundry appliance according to claim 1, wherein before fixing said front panel to said housing by said at least one fixing device there is a gap between the front panel and the at least one front face, and the pulling device, by the pulling force, closes, in a pulling movement generated by fixing said front panel to said housing by said at least one fixing device, the gap and exerts a residual pulling force as a pressure between the front panel and the at least one front face.

4. A laundry appliance according to claim 3, wherein the pulling displacement of the two pulling elements is larger than the gap.

5. A laundry appliance according to claim 1, wherein the pulling direction is substantially orthogonal or perpendicular to the fixing direction and/or
wherein the pulling direction is substantially horizontal and/or wherein the fixing direction is substantially vertical and/or downwards or in the direction of gravity.

6. A laundry appliance according to claim 1, wherein at least two front faces are provided at the front of two side walls of the housing and/or wherein at each front face a corresponding fixing device and a corresponding pulling device are provided.

7. A laundry appliance according to claim 6, wherein the cabinet further comprises a bracket element, which substantially extends in between the two side walls, wherein each end portion of said bracket element and an upper or uppermost region of a corresponding side wall and a corresponding upper or uppermost region of the front panel are connected with each other.

8. A laundry appliance according to claim 7, wherein the bracket element comprises one of the pulling elements of the pulling device.

9. Laundry appliance, for example laundry washing machine, laundry dryer or laundry washer dryer, comprising
a) a cabinet with a housing having at least one front face and at least one front panel,
b) at least one fixing device for fixing said front panel to the housing by applying a fixing force in a fixing direction, and
c) at least one pulling device for exerting a pulling force in a pulling direction onto the front panel pulling the front panel against at least one front face of the housing,
d) wherein the fixing direction of the fixing force is different than the pulling direction of the pulling force,
e) wherein the fixing device is coupled to the pulling device in such a way that the fixing force generates the pulling force or is partly transformed into the pulling force,
wherein the or each pulling device comprises at least two pulling elements, a first pulling element being coupled to the front panel and a second pulling element being coupled to the fixing device, wherein the first pulling element is, by the fixing force, displaced relative to the second pulling element by a pulling displacement in a displacement movement in the pulling direction or having at least a component in the pulling direction, whereby the pulling force onto the front panel is generated or transformed from the fixing force,
wherein one pulling element is a protruding element and the other pulling element is a pulling recess, and the protruding pulling element is forced by the fixing force into the pulling recess sliding with a sliding edge or surface on a surface adjacent the pulling recess until a rear edge or surface of the protruding pulling element bears against an inner rear wall of the pulling recess resulting in the displacement in the pulling direction of the two pulling elements, and wherein the sliding edge or surface is curved and/or convex and/or wherein the rear edge or surface and the inner rear wall are orthogonal to the displacement movement and/or pulling direction.

10. Laundry appliance, for example laundry washing machine, laundry dryer or laundry washer dryer, comprising
   a) a cabinet with a housing having at least one front face and at least one front panel,
   b) at least one fixing device for fixing said front panel to the housing by applying a fixing force in a fixing direction, and
   c) at least one pulling device for exerting a pulling force in a pulling direction onto the front panel pulling the front panel against at least one front face of the housing,
   d) wherein the fixing direction of the fixing force is different than the pulling direction of the pulling force,
   e) wherein the fixing device is coupled to the pulling device in such a way that the fixing force generates the pulling force or is partly transformed into the pulling force,
   wherein the or each pulling device comprises at least two pulling elements, a first pulling element being coupled to the front panel and a second pulling element being coupled to the fixing device, wherein the first pulling element is, by the fixing force, displaced relative to the second pulling element by a pulling displacement in a displacement movement in the pulling direction or having at least a component in the pulling direction, whereby the pulling force onto the front panel is generated or transformed from the fixing force,
   wherein before fixing said front panel to said housing by said at least one fixing device there is a gap between the front panel and the at least one front face, and the pulling device, by the pulling force, closes, in a pulling movement generated by fixing said front panel to said housing by said at least one fixing device, the gap and exerts a residual pulling force as a pressure between the front panel and the at least one front face, and wherein the pulling displacement of the two pulling elements is larger than the gap.

11. Laundry appliance, for example laundry washing machine, laundry dryer or laundry washer dryer, comprising
   a) a cabinet with a housing having at least one front face and at least one front panel,
   b) at least one fixing device for fixing said front panel to the housing by applying a fixing force in a fixing direction, and
   c) at least one pulling device for exerting a pulling force in a pulling direction onto the front panel pulling the front panel against at least one front face of the housing,
   d) wherein the fixing direction of the fixing force is different than the pulling direction of the pulling force,
   e) wherein the fixing device is coupled to the pulling device in such a way that the fixing force generates the pulling force or is partly transformed into the pulling force,
   wherein at least two front faces are provided at the front of two side walls of the housing and/or wherein at each front face a corresponding fixing device and a corresponding pulling device are provided,
   wherein the cabinet further comprises a bracket element, which substantially extends in between the two side walls, wherein each end portion of said bracket element and an upper or uppermost region of a corresponding side wall and a corresponding upper or uppermost region of the front panel are connected with each other, and
   wherein the or each pulling device comprises at least two pulling elements, a first pulling element being coupled to the front panel and a second pulling element being coupled to the fixing device, wherein the first pulling element is, by the fixing force, displaced relative to the second pulling element by a pulling displacement in a displacement movement in the pulling direction or having at least a component in the pulling direction, whereby the pulling force onto the front panel is generated or transformed from the fixing force, wherein the bracket element comprises one of the pulling elements of the pulling device.

* * * * *